July 31, 1956  E. G. DAVIS  2,757,055
GRID BEARING AND METHOD OF MAKING SAME
Filed Jan. 8, 1953

INVENTOR
Edgar G. Davis
BY Willits, Helmich Baillio
ATTORNEYS

United States Patent Office 2,757,055
Patented July 31, 1956

2,757,055

GRID BEARING AND METHOD OF MAKING SAME

Edgar G. Davis, Brownsburg, Ind., assignor to General Motors Corporation, Detroit, Mich., a corporation of Delaware Application January 8, 1953, Serial No. 330,255

16 Claims. (Cl. 308—239)

This invention relates to improvements in grid bearings.

Grid bearings are characterized by bearing surfaces consisting of a multiplicity of small areas of hard and soft bearing materials arranged in alternating succession circumferentially, and preferably also longitudinally with respect to the shaft. The hard material is united with a strong supporting back to enable the bearing to carry heavy loads. This load bearing structure is referred to as the grid or matrix. The areas of soft material preferably are well bonded to the matrix and give the bearing desirable frictional properties as well as improved embeddability. Silver has frictional and embeddability characteristics which make it an especially desirable matrix material for grid bearings. However, difficulties have been encountered with prior silver grid bearings because silver is corroded by lubricants containing sulfur.

It is a principal object of this invention to provide an improved silver grid bearing wherein the silver is protected from corrosion caused by lubricants containing sulfur.

I have discovered that a silver grid bearing which is highly resistant to corrosion caused by lubricants containing sulfur may be obtained by depositing a coating of tin onto a silver matrix surface provided with a multiplicity of indentations or grid pits, and thereafter diffusing the tin and silver by heat treatment before filling the grid pits with a soft bearing material to form a corrosion-resistant bearing surface comprising a multiplicity of alternating areas of soft bearing material and diffused tin-silver.

In practice, the tin is applied to the grid surface as an electrodeposited coating having a thickness within the range of about 0.0001" to 0.0005". In many cases optimum results are obtained by employing a tin coating having a thickness of about 0.0002" to 0.0003". The temperature employed for the diffusion heat-treatment is within the range of approximately 600° F. to 1000° F. for a time of about ten minutes or more. The diffusion heat-treatment may be carried out in air, when temperatures of not above 1000° F. are employed. Where temperatures higher than 1000° F. are used, a neutral or reducing atmosphere should be maintained. If desired, the neutral or reducing atmosphere also may be used for diffusion temperatures of 1000° F. or less. Where temperatures of not more than about 800° F. are employed, extended periods of heat-treatment may be employed, for example, as much as ten hours or more. The upper limit of time at the higher temperatures of 900° F. to 1000° F. is dictated by the diffusion depth. At present, I prefer to heat treat a tin plate having a thickness of about 0.0002" to 0.0003" for about thirty minutes at 800° F.

In order to obtain a superior performance with a silver grid bearing embodying the present invention it is desirable to have the alternating areas of soft bearing material spaced from each other in such a manner that the number of grid pits or depressions per lineal inch is not less than about 15. While grid bearings having a very fine grid pattern will support heavy loads and afford longer life, in the case of bearings having more than about 100 grid pits per lineal inch, manufacture is difficult because the pits or depressions are necessarily quite shallow and impose closer tolerances on machining operations. At present, I prefer to employ a silver grid bearing having between about 19 and 65 grid pits per lineal inch. It will be understood, of course, that the grid pits or depressions may be arranged over the bearing surface in any desired pattern. Thus, the grid pits or depressions may consist of fine grooves extending longitudinally and/or circumferentially with respect to the bearing. In another embodiment the silver matrix may be provided with tin-silver projections which are exposed at the bearing surface to take the load and are surrounded by soft bearing material. A preferred form comprises a silver matrix having a multiplicity of small circumferentially and longitudinally spaced pits or depressions.

Various soft bearing materials may be employed to fill the grid pits, for example, lead-base alloys, such as alloys of lead containing small amounts of tin and/or antimony, tin-base alloys or other babbitt-type bearing materials. Excellent results are obtained in many instances by employing lead-tin alloys or lead-indium alloys. At times, it is desirable to cast a soft bearing material into the grid pits; a preferred alloy for such casting is an alloy which consists essentially of 94% lead, 3% tin and 3% antimony. At present, I prefer to electrodeposit an alloy of lead and tin, particularly an alloy containing about 7% to 12% tin. In general, any soft bearing metal or alloy which may be electrodeposited, cast or otherwise applied to fill the grid pits may be used. Hence, the term "bearing material" as used herein is intended to include various conventional bearing metals and alloys.

Since the diffusion heat-treatment is conducted at temperatures which generally exceed the melting point of the soft bearing material employed in the grid pits, the manufacture of silver grid bearings as described herein involves certain difficulties which I have succeeded in solving by employing the following method of manufacture:

I first electrodeposit silver onto a backing or bearing support of a harder or stronger metal such as steel or the like. The silver may be electrodeposited in any ordinary grid bearing thickness such as a thickness generally within the range of about 0.005" to 0.100". In many cases thicknesses of about 0.010" to 0.035" are preferred. In many instances it is desirable to employ a flash or strike electrodeposited coating on the backing member over which the silver is then electrodeposited to the desired thickness. The flash or strike coating, preferably of copper or nickel, aids in forming a strong bond between the silver and the backing member. For a bearing using a copper strike, a copper thickness of about 0.000020" is preferred with the practicable range being about 0.0000050" to 0.000100" thickness. Using a nickel strike, a nickel thickness of about 0.000010" is presently preferred, with the typically practicable range being from about 0.000005" to 0.000100" thickness.

It is usually desirable to anneal the silver before machining. Where neither a nickel nor copper strike is applied, the silver is normally annealed at a temperature of about 975° F. for one hour. In the case of a copper strike, it is preferred not to anneal the silver above about 1200° F. to prevent the formation of a relatively weak copper-silver eutectic alloy with a consequent weakening of the bond. In the case of a nickel strike, the maximum annealing temperature is about 1400° F.

Where temperatures of about 1050° F. or higher are employed for the annealing operation it is necessary to employ a neutral or reducing atmosphere. Temperatures much lower than 975° F. also may be employed. In fact, temperatures down to as low as room temperature may be used in certain cases depending on the characteristics of the silver bearing material which is deposited.

The silver bearing is then bored or machined to provide a uniform bearing wall thickness. After the silver bearing is bored, grid pits or indentations are formed on its surface in any suitable manner as by passing the silver bearing under a knurling roll or other roller die capable of forming the desired grid pits in the surface of the silver.

After the surface of the silver matrix has been gridded, a coating of tin is electrodeposited over the gridded surface. The resulting structure is then heat treated at an elevated temperature to form a diffused tin-silver zone which is extremely resistant to corrosion by lubricants containing sulfur as well as to abrasive wear.

The depth of the diffusion zone, of course, may be varied, depending on the type of bearing and its intended application. Generally, for superior performance, the diffused tin-silver zone should have a sufficient depth to provide corrosion protection for the silver matrix after a portion of the silver load-supporting projections which form the matrix surface are removed, either in subsequent stages of manufacture, or by gradually wearing away in use. As a particular example, in a bearing having 50 grid pits per lineal inch, the median lateral dimension of the load-supporting surface of the matrix projection is about 0.0059″. Hence, for optimum results the diffused zone depth should then be slightly over one-half this thickness, e. g., about 0.003″, so that diffusion of the tin and silver into each side of the silver projection will provide corrosion protection for the center portion of the projection exposed as a wear surface. Hence, depending on the uses to which the bearings are to be subjected, the particular metal compositions employed, etc., as well as the grid sizes and distribution, the depth of the diffused zone should vary between about 0.0005″ and 0.001″.

After the diffusion heat-treatment, a soft bearing material is electrodeposited or, in some instances, cast over the surface of the matrix in a thickness sufficient to fill the grid pits at least to the level of the matrix load-supporting projections. In a preferred embodiment, the soft bearing metal is applied onto the matrix in a thickness greater than the depth of the grid pits and a portion of the resulting surface and of the matrix subsequently removed by machining or the like to provide a bearing wear surface comprising a multiplicity of spaced alternating areas of soft bearing material and diffused tin-silver.

Referring now to the accompanying drawing.

Figure 1:
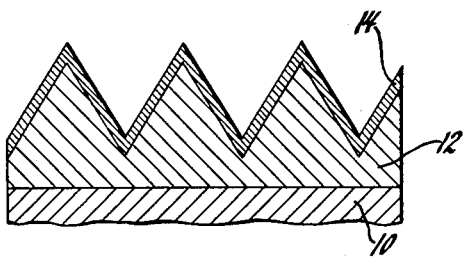
Figure 1 is a somewhat schematic, fragmentary, enlarged sectional view of a gridded bearing blank showing the several layers of the metals prior to diffusion of the tin and silver.
Figure 2:
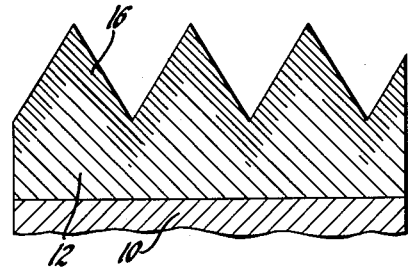
Figure 2 is a view similar to Figure 1 after the diffusion of the tin and silver.
Figure 3:
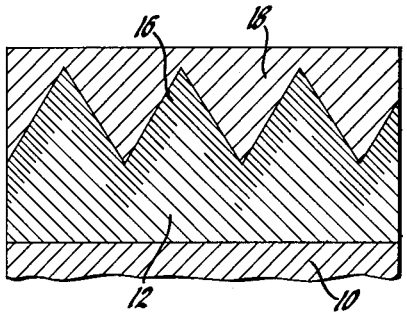
Figure 3 is a view similar to Figure 2 except that a layer of a soft bearing material has been deposited over the grid surface.
Figure 4:
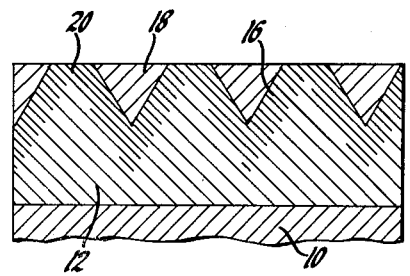
Figure 4 is a schematic, fragmentary enlarged sectional view of a completed bearing in accordance with the present invention.

Referring more particularly to the drawing, in Figures 1 through 4 is shown a backing member 10 of a strong metal, such as steel, to which is applied an electrodeposited coating of silver which is subsequntly knurled to form a matrix designated as 12. As shown in Figure 1 a coating 14 of tin is applied over the matrix 12. This tin coating is then diffused into the silver by heat-treatment, resulting in the structure as shown in Figure 2 in which 16 represents the diffused tin-silver zone. After the diffusion heat-treatment, a soft bearing metal 18 such as a lead-tin alloys, a lead-indium alloy, lead, tin or indium is applied over the gridded surface as shown in Figure 3. In Figure 4, illustrating a completed bearing in accordance with the present invention, it will be seen that after the upper portions of the soft bearing material and the apices of the gridded matrix are removed by machining or the like to produce a composite bearing surface the thickness of the diffused zone 16 is sufficient to provide corrosion protection at the exposed surface 20 of the matrix.

Figure 5:
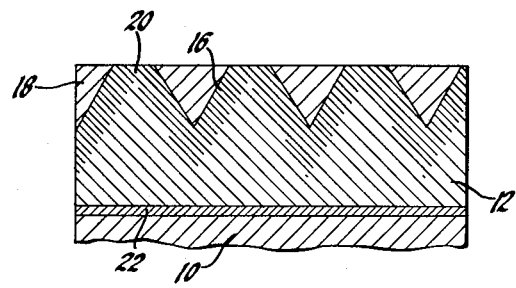
Figure 5 is a schematic enlarged sectional view of a portion of a completed bearing in accordance with another embodiment of the invention in which a bonding layer is shown interposed between the backing material and the silver grid.
Figure 6:
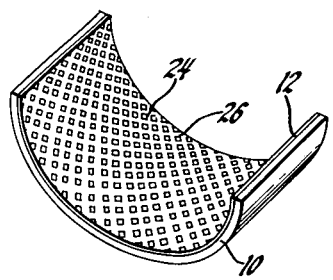
Figure 6 is a perspective view illustrating the gridded surface of a completed bearing.

A completed bearing formed in accordance with another embodiment of the invention is shown in Figure 5. This bearing is generally similar to the bearing showing in Figure 4, but is provided with a flash coating 22 of nickel, nickel base alloy, copper, copper base alloy or other metal intermediate the matrix 12 and backing member 10. Such a bearing may be formed by the above-described process except that a flash or strike coat of nickel, copper or other metal or alloy is employed between the backing member and the silver matrix. Figure 6 illustrates, in perspective, a completed bearing in which the bearing wear surface is made up of a multiplicity of areas of soft bearing material 24 surrounded by a matrix surface 26 formed of diffused tin-silver.

The term "silver" as used herein is intended, of course, to include silver-base alloys containing small amounts of alloying constituents other than silver, as well as commercially pure silver.

It is to be understood that, although the invention has been described with specific reference to particular embodiments thereof, it is not to be so limited since changes and alterations therein may be made which are within the full intended scope of this invention as defined by the appended claims.

It is claimed:

1. A grid bearing having a silver matrix provided with a multiplicity of grid pits formed on its surface, the pitted surface of said matrix having tin diffused therein, and soft bearing material filling said grid pits to provide a wear surface which comprises alternating areas of soft bearing material and diffused tin-silver.

2. A grid bearing as in claim 1 in which the silver matrix is supported by a strong backing member.

3. A grid bearing as in claim 1 in which the silver matrix is secured to a strong backing member through a tin metallic coating.

4. A grid bearing comprising a strong supporting back, a thin coating thereon of at least one metal selected from the class consisting of nickel, nickel base alloys, copper and copper base alloys, and a silver matrix bonded to said coating, said silver matrix having a corrosion-resistant bearing surface of a multiplicity of alternating small areas of a lead-base bearing alloy and tin-silver.

5. A grid bearing having an annealed silver matrix provided with a corrosion-resistant bearing surface comprising a multiplicity of small areas of diffused tin-silver and a lead-tin bearing alloy.

6. A grid bearing comprising a silver matrix having 15 to 100 grid pits per lineal inch formed in its surface, said matrix having its surface portion formed of a diffused tin-silver zone and a lead-base alloy embedded in said grid pits.

7. The method of making a grid bearing which comprises die forming a multiplicity of grid pits on the surface of a silver bearing layer, applying a thin coating of tin to the resultant gridded surface of said silver layer, heat treating the resulting structure at an elevated temperature for a time sufficient to cause diffusion of the tin and silver, thereafter filling said grid pits with a soft bearing material, and subsequently removing a portion of the soft bearing material and diffused tin-silver.

8. The method of making a grid bearing which comprises forming 15 to 100 grid pits per lineal inch on the surface of a silver bearing layer, electrodepositing a thin coating of tin onto the resultant gridded surface of said silver layer, heat treating the tin-coated matrix, thereafter electrodepositing a soft bearing material onto the silver matrix to a depth at least sufficient to completely fill the grid pits, and subsequently machining off a portion of the soft bearing material and heat-treated tin-coated matrix.

9. The method of forming a grid bearing which comprises bonding a layer of silver to a supporting back of relatively hard metal, forming a multiplicity of small grid pits in the surface of said silver layer, applying a coating of tin to said silver surface, heating the silver and tin to a temperature within the approximate range of 600° F. to 1000° F. for a time sufficient to cause diffusion of the tin and silver, thereafter depositing a layer of soft bearing material onto the resulting surface to a depth at least sufficient to completely fill the grid pits, and subsequently removing a portion of the soft bearing material and matrix to provide a bearing surface which comprises a multiplicity of small areas of soft bearing material and diffused tin-silver.

10. The method of making a bearing which comprises electrodepositing a flash coating of a metal of the class consisting of copper and nickel onto a strong backing member, electrodepositing a coating of silver onto said flash coating, forming a multiplicity of small pits in the surface of the silver, electrodepositing tin onto the silver and heat-treating the product of the preceding steps at an elevated temperature, thereafter applying a layer of soft bearing material over the gridded surface, and subsequently removing a portion of the soft bearing material and diffused tin-silver.

11. The method as in claim 8 which includes the step of annealing the silver prior to electrodepositing the tin thereon.

12. The method of forming a grid bearing which comprises providing a supporting back of relatively hard and strong metal, bonding to said back a layer of silver having a thickness within the approximate range of 0.01" to 0.035", forming a multiplicity of grid pits on the surface of said silver, electrodepositing a coating of tin having a thickness within the approximate range of 0.0001" to 0.0005" on the silver, then heating the back, silver and tin to a temperature within the range of approximately 600° F. to 1000° F. for a time sufficient to produce a diffusion of the tin and silver, thereafter applying to the heat treated surface a soft bearing material, and subsequently removing a portion of the soft bearing material and diffused tin-silver to provide a bearing surface comprising a multiplicity of alternating small areas of said soft bearing material and said diffused tin-silver.

13. The method of making a grid bearing according to claim 10 in which a thin layer of metal is electrodeposited on the supporting back prior to bonding of a silver layer thereto.

14. A corrosion-resistant grid bearing comprising a steel backing layer, a thin coating of a metal selected from the class consisting of nickel, nickel base alloys, copper and copper base alloys bonded to said steel backing layer, said coating having a thickness between 0.000005 inch and 0.0001 inch, a layer of silver having a thickness between 0.005 inch and 0.1 inch bonded to the surface of said coating, said silver layer having 19 to 65 grid pits per lineal inch formed in its surface, the surface areas of said silver layer defining said grid pits being provided with a diffusion zone of tin-silver between 0.0005 inch and 0.001 inch in thickness, and a soft bearing metal selected from the class consisting of lead-tin alloys and lead-indium alloys embedded in said grid pits.

15. A method of forming a corrosion-resistant grid bearing which comprises electrodepositing a flash coating of a metal selected from the class consisting of nickel, nickel base alloys, copper and copper base alloys onto a steel backing member, electrodepositing a layer of silver onto said flash coating, annealing said silver layer, thereafter die forming a multiplicity of circumferentially and transversely spaced small grid pits in the surface of said silver layer, electrodepositing a thin coating of tin over the formed gridded surface of said layer, diffusing the tin into said gridded surface by heat treatment at a temperature within the range of approximately 600° F. to 1000° F. for a period of time sufficient to form a tin-silver diffusion zone having a thickness between 0.0005 inch and 0.001 inch, subsequently applying to said gridded surface a soft layer of lead-base alloy having a thickness greater than the depth of said grid pits, and finally machining off a portion of said lead-base alloy layer and diffused tin-silver to expose a bearing surface which comprises a multiplicity of alternating areas of said lead-base alloy and tin-silver.

16. A method of forming a corrosion-resistant grid bearing which comprises electrodepositing approximately 0.000005 inch to 0.0001 inch of a metal selected from the class consisting of nickel, nickel base alloys, copper and copper base alloys onto a steel backing member, electrodepositing a layer of silver having a thickness between approximately 0.005 inch and 0.1 inch onto said first coating, annealing said silver layer, thereafter die forming a multiplicity of circumferentially and transversely spaced grid pits in the surface of said silver layer so as to provide about 19 to 65 grid pits per lineal inch, electrodepositing a coating of tin having a thickness of about 0.0001 inch to 0.0005 inch over the formed gridded surface of said silver layer, diffusing the tin into said gridded surface to a distance between approximately 0.0005 inch and 0.001 inch by heat treatment at a temperature of about 600° F. to 1000° F. for at least 10 minutes so as to form a tin-silver diffusion zone having a thickness of approximately 0.0005 inch to 0.001 inch, subsequently applying to said gridded surface a layer of soft lead base alloy having a thickness greater than the depth of said grid pits, and finally machining off a portion of said lead base alloy layer and diffused tin-silver to expose a bearing surface consisting of a multiplicity of alternating areas of said lead base alloy and tin-silver.

References Cited in the file of this patent

UNITED STATES PATENTS

| | | |
|---|---|---|
| 2,187,755 | Ryder | Jan. 23, 1940 |
| 2,241,789 | Queneau et al. | May 13, 1941 |
| 2,431,430 | Shaw | Nov. 25, 1947 |
| 2,621,988 | Donley | Dec. 16, 1952 |

FOREIGN PATENTS

| | | |
|---|---|---|
| 536,414 | Great Britain | May 14, 1941 |
| 683,404 | Great Britain | Nov. 26, 1952 |